United States Patent
Tong et al.

(10) Patent No.: US 12,314,629 B2
(45) Date of Patent: May 27, 2025

(54) WIRELESS AUDIO SYSTEM AND METHOD FOR WIRELESSLY COMMUNICATING AUDIO INFORMATION

(71) Applicant: Bestechnic (Shanghai) Co., Ltd., Shanghai (CN)

(72) Inventors: Weifeng Tong, Shanghai (CN); Rui Mei, Shanghai (CN); Xiongzhi Chen, Shanghai (CN); Qianli Ma, Shanghai (CN); Liang Zhang, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 220 days.

(21) Appl. No.: 18/095,560

(22) Filed: Jan. 11, 2023

(65) Prior Publication Data

US 2023/0401026 A1  Dec. 14, 2023

(30) Foreign Application Priority Data

May 19, 2022 (CN) .......................... 202210541597.5

(51) Int. Cl.
*G06F 3/16* (2006.01)
*G10L 19/008* (2013.01)
(Continued)

(52) U.S. Cl.
CPC ............ *G06F 3/162* (2013.01); *G10L 19/008* (2013.01); *H04R 5/033* (2013.01); *H04W 76/38* (2018.02); *H04R 2420/07* (2013.01)

(58) Field of Classification Search
CPC ...... H04R 3/12; H04R 27/00; H04R 2420/07; G06F 3/165
(Continued)

(56) References Cited

U.S. PATENT DOCUMENTS 8,442,596 B2 * 5/2013 Frerking ................ H04B 15/00
455/569.1
10,524,300 B2 * 12/2019 Ueda ....................... H04W 4/80
(Continued)

FOREIGN PATENT DOCUMENTS

| CN | 110390940 A | 10/2019 |
| CN | 111436042 A | 7/2020 |
| CN | 112135285 A | 12/2020 |

OTHER PUBLICATIONS

First Office Action in related Chinese Application No. 202210541597.5 dated Jul. 22, 2022 (7 pages).
(Continued)

*Primary Examiner* — Disler Paul
(74) *Attorney, Agent, or Firm* — Bayes PLLC

(57) ABSTRACT

Wireless audio systems and methods for wirelessly communicating audio information are provided. The wireless audio system includes a first wireless transceiver and a second wireless transceiver. The first wireless transceiver includes a first communication module, a first codec, and a second communication module. The first communication module is configured to receive, from an audio source, first audio information. The first codec includes a first decoder configured to obtain second audio information by decoding the first audio information, and a first encoder configured to obtain third audio information by encoding the second audio information. The second communication module is configured to send the third audio information out. The second wireless transceiver includes a third communication module configured to receive the third audio information from the first wireless transceiver. The first communication module employs Classic Bluetooth, and the second communication module and the third communication module employ Low Energy (LE) Audio.

18 Claims, 13 Drawing Sheets

(51) Int. Cl.
*H04R 5/033* (2006.01)
*H04W 76/38* (2018.01)

(58) Field of Classification Search
USPC .................................................. 381/77–82, 22
See application file for complete search history.

(56) References Cited

U.S. PATENT DOCUMENTS

| | | | |
|---|---|---|---|
| 11,259,192 B2* | 2/2022 | Hariharan | H04L 43/0847 |
| 11,546,705 B2* | 1/2023 | Chen | H04R 1/1091 |
| 11,647,332 B2* | 5/2023 | Gu | H04W 4/08 |
| | | | 455/41.3 |
| 11,950,058 B2* | 4/2024 | Liu | H04W 4/80 |
| 12,045,541 B2* | 7/2024 | Ramasubramanian | |
| | | | H04L 12/2803 |
| 2014/0328485 A1* | 11/2014 | Saulters | G06F 3/165 |
| | | | 381/119 |
| 2019/0104424 A1* | 4/2019 | Hariharan | H04L 1/1621 |
| 2024/0267684 A1* | 8/2024 | Liu | H04R 25/552 |

OTHER PUBLICATIONS

First Office Action in related Chinese Application No. 202210541597.5 dated Aug. 15, 2022 (3 pages).

* cited by examiner

WIRELESS AUDIO SYSTEM AND METHOD FOR WIRELESSLY COMMUNICATING AUDIO INFORMATION

CROSS-REFERENCE TO RELATED APPLICATIONS

This application claims the benefit of priority to Chinese Patent Application No. 202210541597.5 filed on May 19, 2022, which is incorporated herein by reference in its entirety.

BACKGROUND

Embodiments of the present disclosure relate to wireless audio systems.

True wireless stereo (TWS) headphones (also known as untethered headphones) are a type of wireless headphones that remove the wires between the left and right headphones. In some TWS headphones, the left and right headphones can simultaneously communicate with an audio source. In some TWS headphones, a primary headphone can simultaneously communicate with an audio source and a secondary headphone. Whichever communication type between the headphones and the audio source, the headphones employ Classic Bluetooth audio to transfer information.

Low Energy (LE) Audio is the next generation of Bluetooth audio, where "LE" stands for Low Energy, as LE Audio operates on the Bluetooth Low Energy radio. LE Audio can enhance the performance of Bluetooth audio and enable a new use case—audio sharing. Existing Classic Audio source products, like a smartphone, should be compatible with LE Audio to use the function provided by LE Audio. For example, a headphone comply with LE Audio cannot share audio with another headphone if the smartphone paired with the headphone is not comply with LE Audio.

SUMMARY

Embodiments of wireless audio systems and methods for wirelessly communicating audio information are disclosed herein.

In one example, a wireless audio system includes a first wireless transceiver and a second wireless transceiver. The first wireless transceiver includes a first communication module, a first codec, and a second communication module. The first communication module is configured to receive, from an audio source, first audio information. The first codec includes a first decoder configured to obtain second audio information by decoding the first audio information, and a first encoder configured to obtain third audio information by encoding the second audio information. The second communication module is configured to send the third audio information out. The second wireless transceiver includes a third communication module configured to receive the third audio information from the first wireless transceiver. The first communication module employs Classic Bluetooth, and the second communication module and the third communication module employ Low Energy (LE) Audio.

In some implementations, the second audio information is a pulse-code modulation (PCM) code, and the third audio information is compatible with LE Audio.

In some implementations, the first encoder is compatible with low complexity communication codec (LC3) or low complexity communication codec plus (LC3+).

In some implementations, the third audio information is encrypted.

In some implementations, the second wireless transceiver is configured to receive, from an electronic device paired with the second wireless transceiver, decryption information for decrypting the third audio information, and the decryption information is generated and sent, by the audio source, to the electronic device paired with the second wireless transceiver.

In some implementations, the third audio information includes a plurality of broadcast channels.

In some implementations, the second wireless transceiver is configured to receive, from an electronic device paired with the second wireless transceiver, information of a selected broadcast channel.

In some implementations, the second wireless transceiver includes a fourth communication module configured to receive the first audio information from the audio source, and a second codec configured to obtain fourth audio information by decoding the first audio information and obtain fifth audio information by encoding the fourth audio information. The fourth communication module employs Classic Bluetooth, and the third communication module is further configured to send the fifth audio information out.

In some implementations, the fourth communication module is activated by activation information sent by the first wireless transceiver when at least one of the following conditions is met: power of the first wireless transceiver is lower than a power threshold, or quality of the first audio information received by the first wireless transceiver is lower than a first quality threshold.

In some implementations, the first wireless transceiver includes a first monitor configured to measure the power of the first wireless transceiver and send the activation information to the second wireless transceiver and connect the second wireless transceiver to the audio source when the power of the first wireless transceiver is lower than the power threshold.

In some implementations; the first wireless transceiver includes a second monitor configured to measure the quality of the first audio information received by the first wireless transceiver and send the activation information to the second wireless transceiver and connect the second wireless transceiver to the audio source when quality of the first audio information received by the first wireless transceiver is lower than the first quality threshold.

In some implementations, the second wireless transceiver includes a third monitor configured to measure quality of the first audio information received by the second wireless transceiver. The third monitor is further configured to send disconnection information to the first wireless transceiver to cut off communication between the audio source and the first wireless transceiver when the quality of first audio information received by the second wireless transceiver is higher than a second quality threshold. The third monitor is otherwise configured to send disconnection information to the fourth communication module to cut off communication between the audio source and the second wireless transceiver when the quality of first audio information received b the second wireless transceiver is lower than the second quality threshold.

In some implementations, the first communication module is configured to disconnect from the audio source after a first period when the fourth communication module is activated.

In another example, a method for wirelessly communicating audio information is provided. The method includes receiving first audio information from an audio source through Classic Audio; obtaining second audio information by decoding the first audio information; obtaining third audio information by encoding the second audio information; and sending the third audio information out through Low Energy (LE) Audio.

In some implementations, the second audio information is a pulse-code modulation (PCM) code, and the third audio information is compatible with LE Audio.

In some implementations, the third audio information is encrypted.

In some implementations, the third audio information includes a plurality of broadcast channels.

In some implementations, the method further includes monitoring power of a first wireless transceiver or quality of the first audio information received by the first wireless transceiver, wherein the first wireless transceiver is configured to perform the method of claim 14.

In some implementations, the method further includes sending activation information out when at least one of the following conditions is met: the power of the first wireless transceiver is lower than a power threshold; or quality of the first audio information received by the first wireless transceiver is lower than a first quality threshold.

In some implementations, the method further includes disconnecting from the audio source after a first period when the activation information is sent out.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
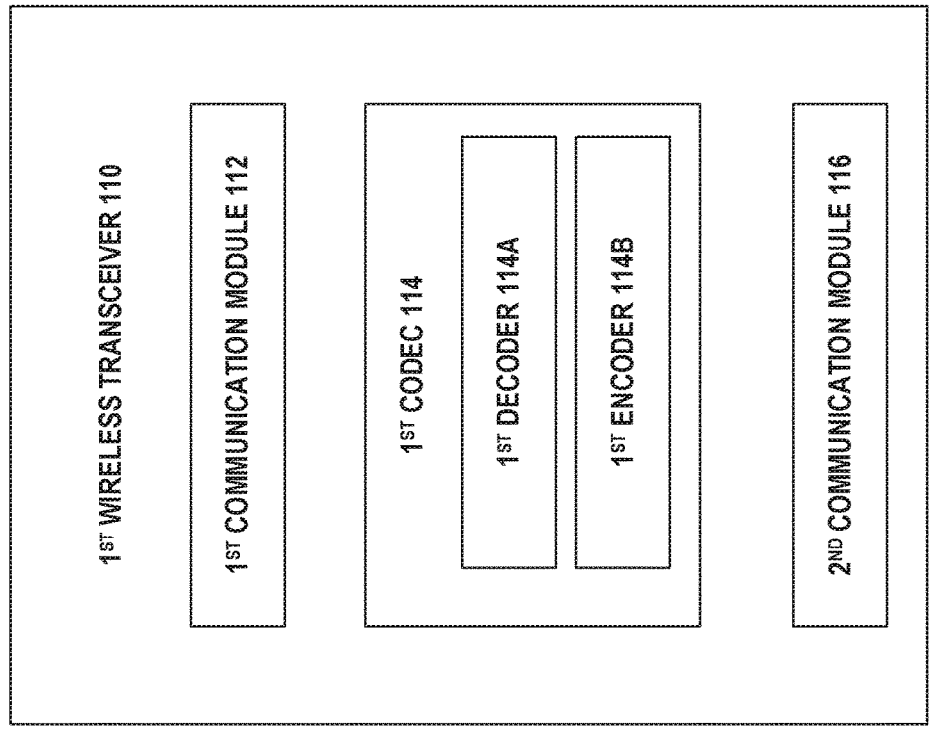
FIG. 1 is a block diagram illustrating an exemplary wireless audio system according to an aspect of the present disclosure.

The presented disclosure is described with reference to the accompanying drawings. In the drawings, generally, like reference numbers indicate identical or functionally similar elements. Additionally, generally, the left-digit(s) of a reference number identifies the drawing in which the reference number first appears.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every, embodiment may not necessarily include the particular feature, structure, or characteristic. Moreover, such phrases do not necessarily refer to the same embodiment. Further, when a particular feature, structure or characteristic is described in connection with an embodiment, it is contemplated that such feature, structure or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may allow for existence of additional factors not necessarily expressly described, again, depending at least in part on context.

True wireless stereo (TWS) headphones (also known as untethered headphones) are a type of wireless headphones that remove the wires between the left and right headphones. In some TWS headphones, the left and right headphones can simultaneously communicate with an audio source. In some TWS headphones, a primary headphone can simultaneously communicate with an audio source and a secondary headphone. Communication between the headphones and the audio source employs Bluetooth Classic radio for information transmission. Bluetooth Classic radio, also referred to as Bluetooth Basic Rate/Enhanced Data Rate (BR/EDR), is a low power radio that streams data over 79 channels in the 2.4 GHz unlicensed industrial, scientific, and medical (ISM) frequency band. Supporting point-to-point device communication, Bluetooth Classic is mainly used to enable wireless audio streaming and has become the standard radio protocol behind wireless speakers, headphones, and in-car entertainment systems. The Bluetooth Classic radio also enables data transfer applications, including mobile printing.

The Bluetooth Low Energy (LE) Audio is designed for very low power operation. Transmitting data over 40 channels in the 2.4 GHz unlicensed ISM frequency band, Bluetooth LE Audio provides developers a tremendous amount of flexibility to build products that meet the connectivity requirements of their market. LE Audio supports multiple communication topologies, expanding from point-to-point to broadcast and, recently, mesh, enabling Bluetooth technology to support the creation of reliable, large-scale device networks. While initially known for its device communications capabilities, LE Audio is now also widely used as a device positioning technology to address the increasing demand for high-accuracy indoor location services. Bluetooth LE now includes features that enable one device to determine the presence, distance, and direction of another device.

Figure 2:
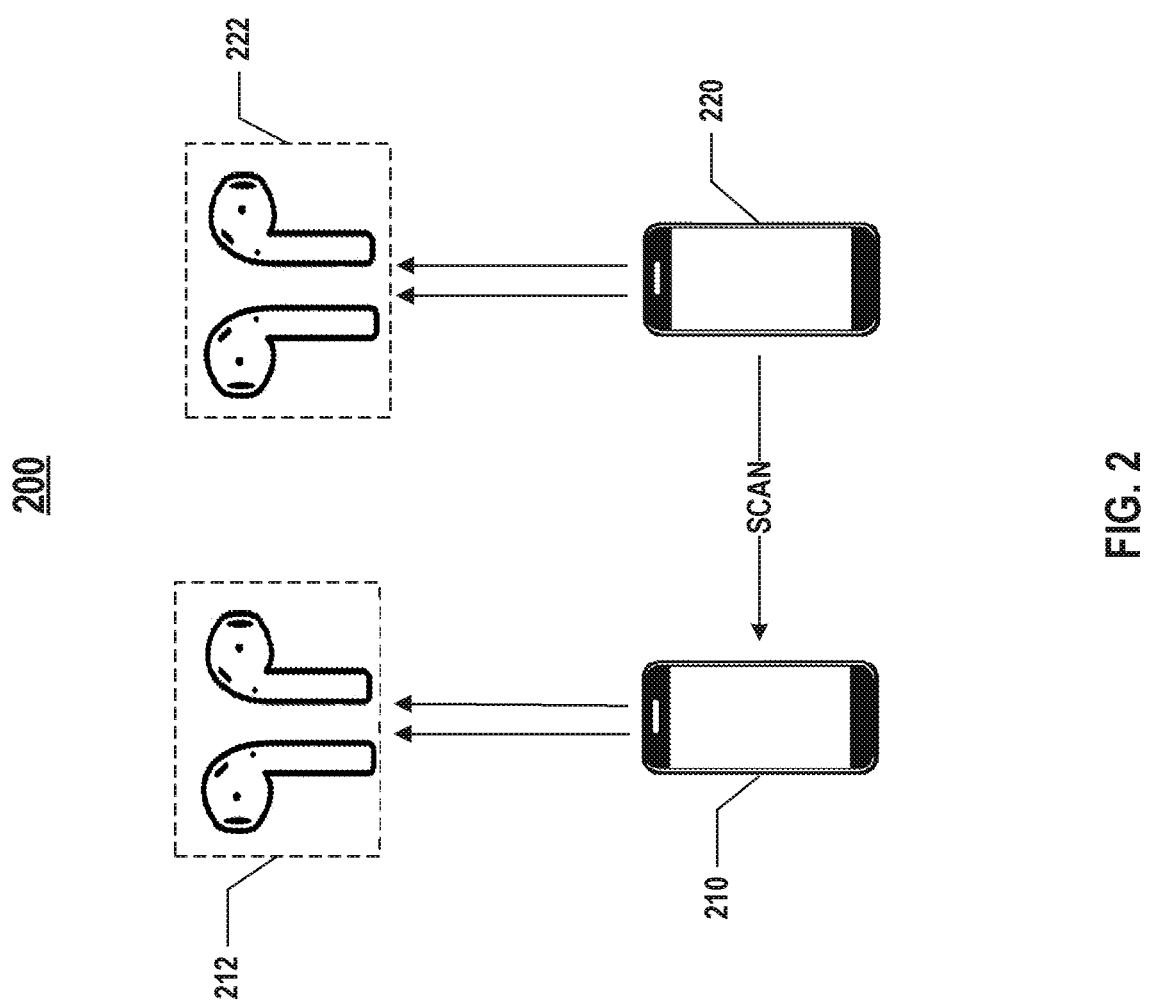
FIG. 2 is a schematical diagram illustrating audio sharing between different audio sources comply with LE Audio according to the prior art.

Referring to FIG. 2, LE Audio can enhance the performance of Bluetooth audio and enable a new use case audio sharing. In FIG. 2, a wireless audio system 200 includes a first pair of headphones 212, a second pair of headphones 222, a first smartphone 210, and second smartphone 220. All the headphones and smartphones are comply with LE Audio. To share audio played in first pair of headphones 212 to second pair of headphones 222, a quick response (QR) code containing communication information of the audio to be shared is generated on first smartphone 210. By scanning the QR code, second smartphone obtains the communication information of the audio to be shared and sends it to second pair of headphones 222, so that second pair of headphones 222 can play the audio and complete audio sharing. LE Audio sharing can be both personal and location-based. With personal audio sharing, users will be able to share their Bluetooth audio experience with people around them, for example, sharing music on their smartphone with family and friends. With location-based audio sharing, Bluetooth audio can be shared in public places such as airports, bars, gyms, movie theaters, and convention centers, enhancing the visitor experience. In public places, TVs will be able to broadcast audio even when they are muted, and venues like theaters and lecture halls will be able to share audio to help hearing-impaired visitors, with multiple language options available.

To share audio through LE Audio, the audio sink products and the audio source products should use the same approach, i.e., both the sinks and sources should be comply with LE Audio. For example, a headphone comply with LE Audio cannot share audio with another headphone if the smartphone paired with the headphone is not comply with LE Audio. existing source products are not comply with LE Audio. Thus, audio sharing cannot be employed. As in FIG. 2, audio sharing cannot realize if one or two of first and second smartphones 210 and 220 are not comply with LE Audio. As LE Audio is the latest Bluetooth technology and smartphone in the market is not comply with LE Audio, audio share can not be popular among users.

To address at least some of the above-mentioned issues, the present disclosure provides a wireless audio system including a first wireless transceiver including a first communication module to communicate with any smart devices comply with Classic Bluetooth through Classic Bluetooth radio, and a second communication module to communicate with other wireless transceivers comply with LE Audio through LE Audio. The first wireless transceiver also includes a codec to transform the formats of audio information between Classic Bluetooth and LE Audio. In this way, audio sharing can be achieved between different transceivers supporting LE Audio regardless of whether the source products are comply with LE Audio or not. For example, neither of the smartphones of user A and user B support LE Audio, while the headphones paired with the smartphones respectively comply with LE Audio, then user A and user B can share audio with the headphones through LE Audio although the smartphones do not support LE Audio. As it is easy and low-cost to update a TWS headphone to support LE Audio, the present disclosure can make audio sharing popular among users.

Figure 3:
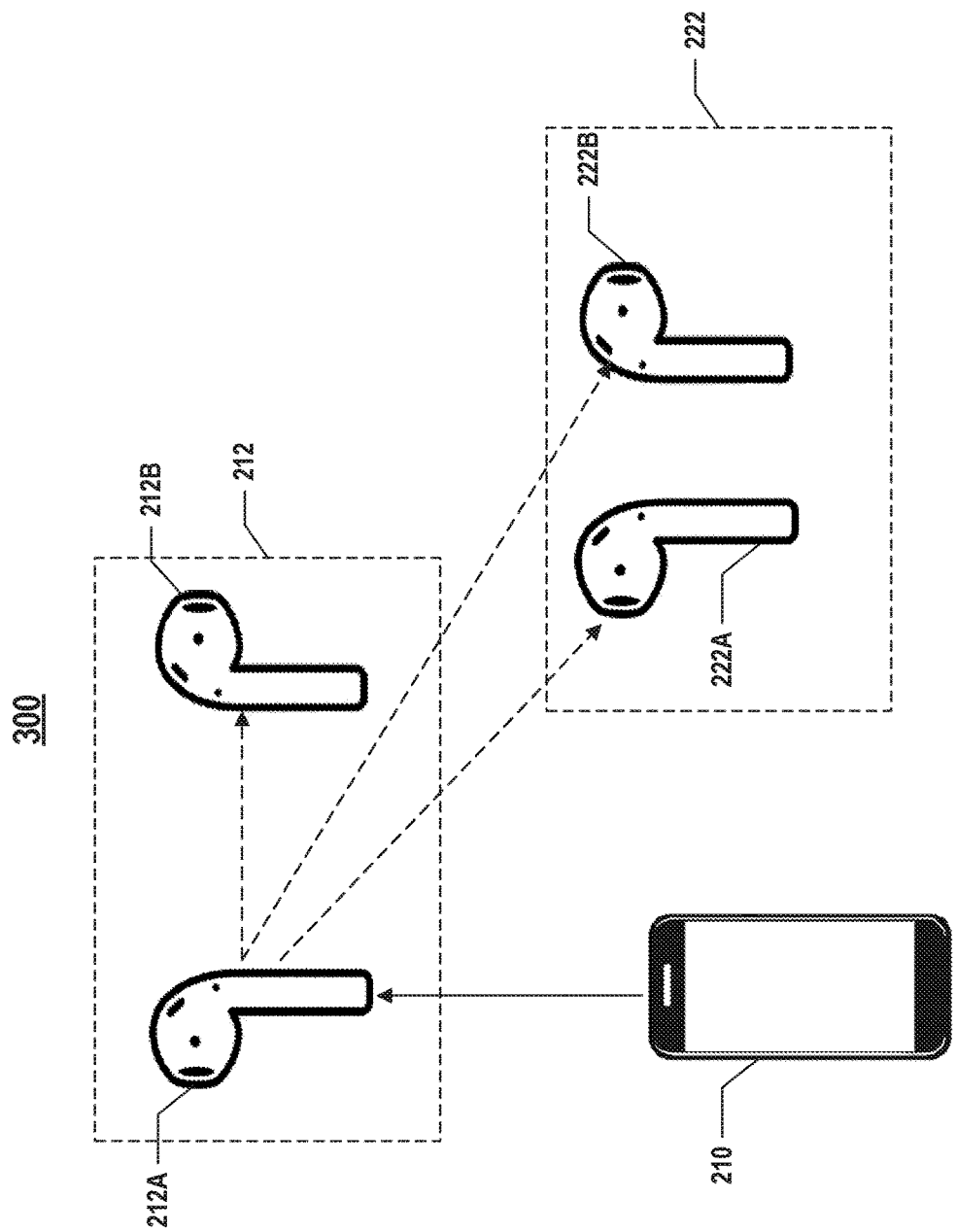
FIG. 3 is a schematical diagram illustrating audio sharing between different headphones comply with LE Audio according to an aspect of the present disclosure.
Figure 4:
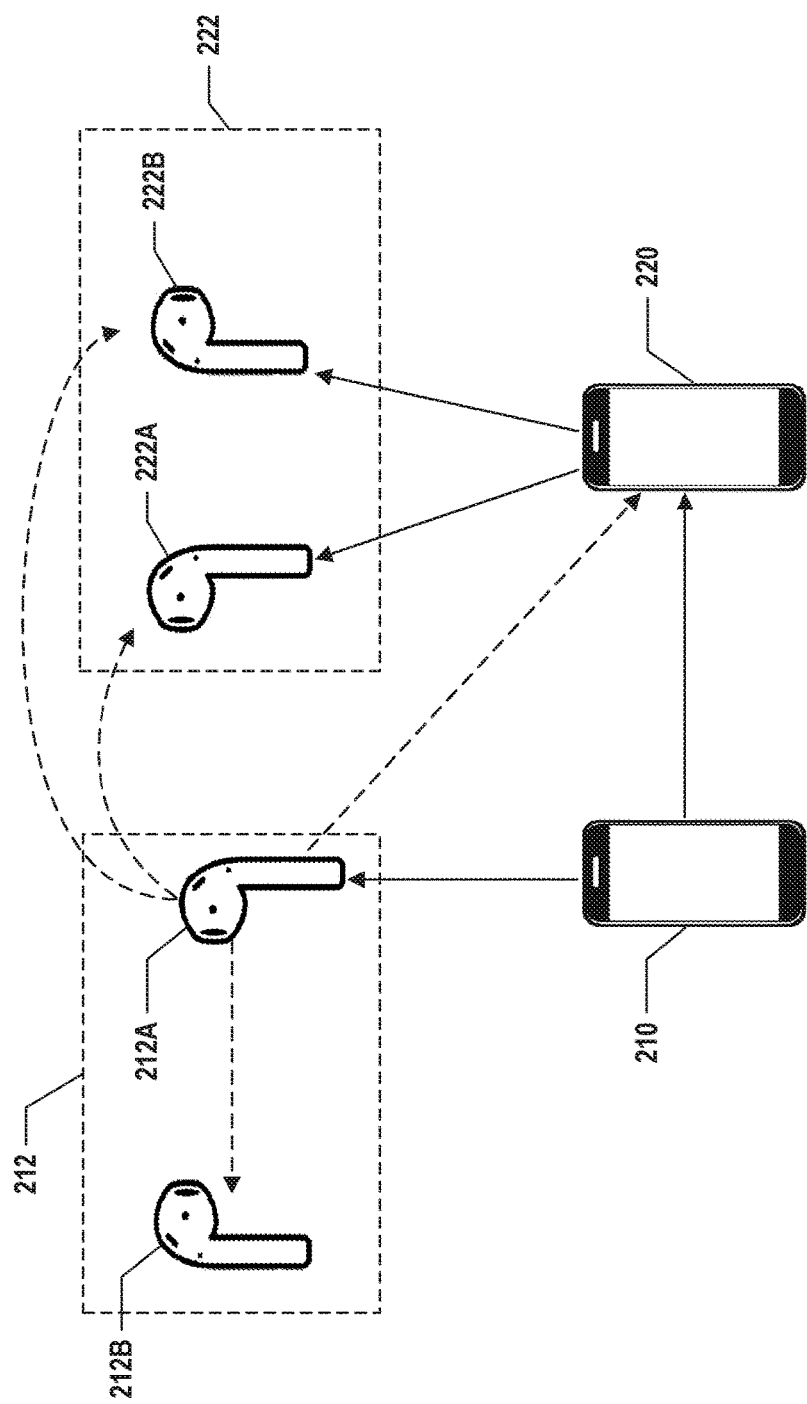
FIG. 4 is a schematical diagram illustrating audio sharing between different headphones comply with LE Audio according to an aspect of the present disclosure.
Figure 5:
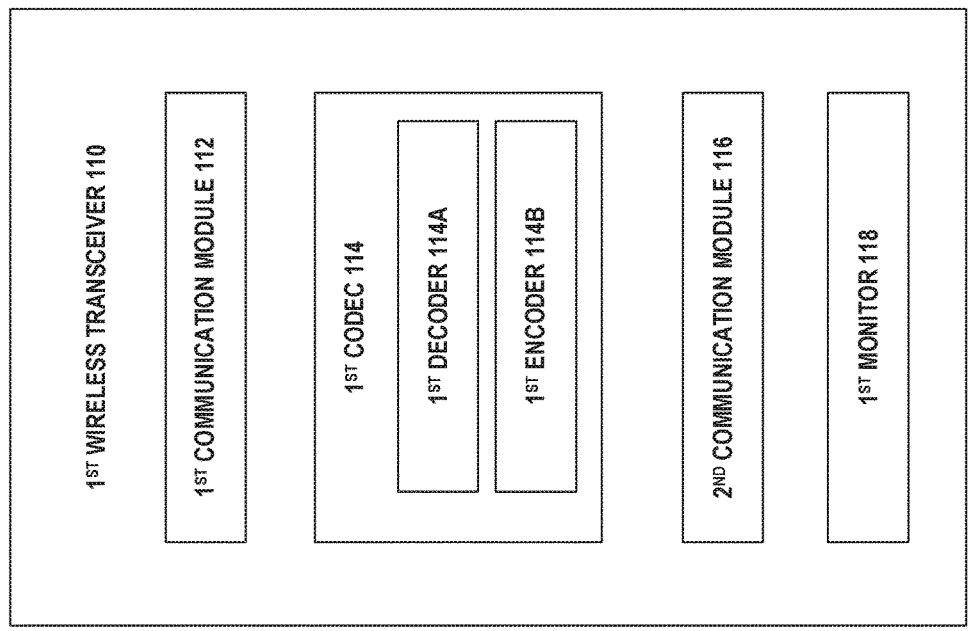
FIG. 5 is a block diagram illustrating an exemplary wireless audio system according to an aspect of the present disclosure.

FIG. 1 illustrates a block diagram of a wireless audio system 100 according to an aspect of the present disclosure. Wireless audio system 100 includes at least a first wireless transceiver 110 and a second wireless transceiver 120. First wireless transceiver 110 and second wireless transceiver 120 include; but not limited to, audio players, headphones, loudspeakers, screens, and the like. In the present implementation, TWS headphones are taking as an example of the wireless transceivers, as shown in FIG. 3 to FIG. 5. Wireless audio system 100 can includes two or more speakers to play multi-channel audio. For example, first wireless transceiver 110 can be a left headphone of a pair of headphones to play audio of a left channel, and second wireless transceiver 120 can be the right headphone of the pair of headphones to play audio of a right channel.

First wireless transceiver 110 includes a first communication module 112, a first codec 114, and a second communication module 116. Second wireless transceiver 120 includes a third communication module 126. Various the communication modules in the present disclosure can be implemented as embedded systems through System on Chips (SOCs), for example, by using various Reduced Instruction Set Computer (RISC) as processors for SOCs to perform corresponding functions. The modules can be, but not limited, to processors, memories, codecs, catchers, etc. Field Programmable Gate Arrays (FPGAs) can also be used to implement the various communication modules to verify the stability of hardware designs.

First communication module 112 is configured to receive, from an audio source, first audio information. The audio source can be a smart device that supports Classic Bluetooth but not LE Audio, like smart devices on the market. A first Classic Bluetooth connection is built between first communication module 112 and the smart device for audio transmission. The first audio information can be encoded and decoded during the audio transmission. For example, the first audio information support sub-band coding (SBC), moving picture expert group (MPEG) coding, Advanced Audio Coding (AAC), adaptive transform acoustic coding (ATRAC), and other coding methods.

First codec 114 includes a first decoder 114A configured to obtain second audio information by decoding the first audio information, and a first encoder 114B configured to obtain third audio information by encoding the second audio information. As described above, the first audio information is sent to first communication module 112 in various coding formats; first decoder 114A can decode the first audio information into pulse-code modulation (PCM) code, i.e., the second audio information. PCM code is the standard form of digital audio in computers, compact discs, digital telephony, and other digital audio applications. In a PCM stream, the amplitude of the analog signal is sampled regularly at uniform intervals, and each sample is quantized to the nearest value within a range of digital steps. First encoder 114B can encode the PCM codes into codes comply with LE Audio, i.e., obtain third audio information by encoding the second audio information. For example, first encoder 114B and the third audio information are comply with low complexity communication codec (LC3) or low complexity communication codec plus (LC3+), or other codecs comply with LE Audio. First codec 114 can be separated from a codec corresponding to the first Classic Bluetooth connection. In other implementations, first codec 114 can be integrated into the codec corresponding to the first Classic Bluetooth connection. By integrating first codec 114 into the codec corresponding to the first Classic Bluetooth connection, the cost and volume of first wireless transceiver 110 are reduced.

Second communication module 116 is configured to send the third audio information out. Second wireless transceiver 120 includes a third communication module 126 configured to receive the third audio information from first wireless transceiver 110. Both second communication module 116 and third communication module 126 employ LE Audio. The third audio information can be broadcasted to second wireless transceiver 120 and other audio players comply with LE Audio by second communication module 116. Second wireless transceiver 120 and other audio players can receive and play the third audio information through LE Audio regardless of the smartphone. The other audio players may pair with different smart devices one by one, like headphones 212 paired with first smartphone 210 and headphones 222 paired with second smartphone 220 in FIG. 2 and FIG. 4. In some implementations, the other audio players may pair with another audio players rather than a smart device, for example, headphones 222 may paired with headphones 212 but not smartphone 220. In some implementations, different audio players may paired with a same smart device, for example, headphones 222 may also paired with smartphone 210 but not smartphone 220. The present disclosure can be applied within any kinds of audio player regardless of the smart device, as long as the audio play complies with LE Audio. That is audio sharing can be achieved within audio players comply with LE Audio even the smartphones paired with the audio players are not comply with LE Audio. In this way, audio sliming can be easily employed among users because the limitation that the smartphone should comply with LE Audio is removed.

As shown in FIG. 3, a wireless audio system 300 in which audio shared between different headphones comply with LE Audio is provided. A first pair of headphones 212 comply with LE Audio, includes a first left headphone 212A and a first right headphone 212B, is paired with a first smartphone 210, which does not support LE Audio. First left headphone 212A is communicated with first smartphone 210 to receive first audio information through Classic Bluetooth. The first audio information is then decoded into PCM codes, i.e., a second audio information by a first decoder of first left headphone 212A, and the second audio information is then encoded into a third audio information comply with LE Audio by a first encoder of first left headphone 212A. The first encoder and the third audio information are both comply with LE Audio. Then the third audio information is broadcasted by first left headphone 212A through LE Audio. First right headphone 212B then receives the broadcasted third audio information by LE Audio. The third audio information can be received by any audio players comply with LE Audio, thus audio sharing is achieved. It is convenient and low-cost to update an audio player to comply with LE Audio, for example, by adding a codec, or reconfiguring the original decoder and encoder in the audio player. For example, the first audio information can be stored in a buffer for the original decoder to decode, a decoded second audio information can be stored in a buffer for the original encoder to encode, and an encoded third audio information can also be stored in a buffer for broadcasting. The cost and volume of the audio player of integrating the codec into the audio player are smaller compared to adding a new codec.

In some implementations of the present disclosure, the third audio information is encrypted. Second wireless transceiver 120 is configured to receive, from an electronic device paired with second wireless transceiver 120, decryption information for decrypting the third audio information; and the decryption information is generated and sent, by the audio source or the first wireless transceiver, to the electronic device paired with second wireless transceiver 120. Referring to FIG. 4, a wireless audio system 400 in which audio shared between different headphones comply with LE Audio. First left headphone 212A of first pair of headphones 212 broadcasts the third audio information out, a second pair of headphones 222 receives the broadcasted information through LE Audio. As the third audio information is encrypted, headphones 222 cannot play the corresponding audio. At this time, first smartphone 210 paired with first headphones sends the decryption information to a second smartphone 220 paired with headphones 222. Then the second smartphone 220 sends the decryption information to headphones 222 through a communication channel between headphones 222 and second smartphone 220 to decrypt the received third information. Thus, the audio can be played by headphones 222. The decryption information can be sent to second smartphone 220 through various wireless communication, for example, but not limited to, Classic Bluetooth radio, zig-Bee, Wi-Fi, Ultra-wideband (MB), or Near-field communication (NFC), For example, first smartphone 210 generates a QR code including decryption information for second smartphone 220 to scan and get the decryption information.

In some implementations of the present disclosure, referring to FIG. 4, second communication module 116 is configured to send identification of the third audio information to second smartphone 220. The identification includes, but not limits to, the source of the audio, channel information, content information, etc. The identification can be displayed on an interactive interface of second smartphone 220 for user to see and react with second smartphone 220 and headphones 222. For example, the third audio information comprises a plurality of broadcast channels, the user can choose whether to receive the third audio information or not and choose which channel to receive. The user can also change the name of the received third audio information, store the received third audio information, and so on. By using second smartphone 220 as a receiver of some information of the third audio information, the interaction of users during audio-sharing is enriched and can meet the needs of users in various scenarios. When a user selects a broadcast to listen, headphones 222, which are wirelessly connected to second smartphone 220, can obtain information of the selected broadcast from second smartphone 220 through wireless communication between second smartphone 220 and headphones 222. In this way, headphones 222 can receive and adjust the channel of the third audio information based on the information of the selected channel.

In FIG. 4, in some implementations, a second left headphone 222A connects to second smartphone 220 through Classic Bluetooth radio, and a second right headphone 222B connects to second smartphone 220 by sniffing the connection between second left headphone 222A and second smartphone 220. The information of the selected channel and the identification are sent to second left headphone 222A and second right headphone 222B, respectively. In other implementations, both second left headphone 222A and second right headphone 222B connect to second smartphone 220 through Classic Bluetooth radio to get the information of the selected channel and the identification. In other implementations, the information of the selected channel and the identification are sent to second left headphone 222A, then forwarded to second right headphone 222B by second left headphone 222A.

FIG. 5 is a block diagram illustrating a wireless audio system 500 according to an aspect of the present disclosure. Compared with wireless audio system 100 showing in FIG. 1, first wireless transceiver 110 of wireless audio system 500 further includes a first monitor 118, second wireless transceiver 120 of wireless audio system 500 further includes a fourth communication module 122 and a second codec 124. Fourth communication module 122 is configured to receive, from the audio source, the first audio information. Second codec 124 includes a second decoder 124A and a second encoder 124B. Second decoder 124A is configured to obtain, by decoding the first audio information, fourth audio information. Second encoder 124B is configured to obtain, by encoding the fourth audio information, fifth audio information. Fourth communication module 122 employs Classic Bluetooth, and third communication module 126 is further configured to send the fifth audio information out.

Figure 7:
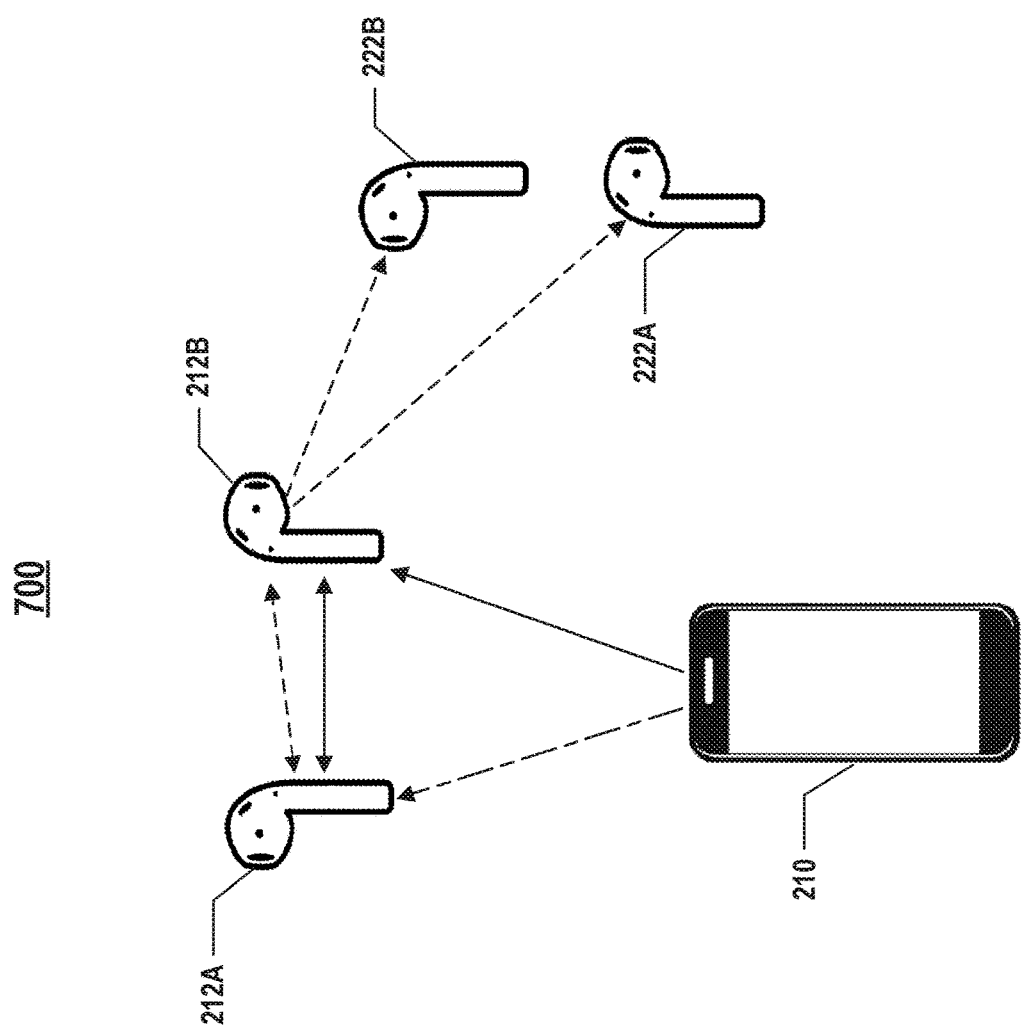
FIG. 7 is a schematical diagram illustrating audio sharing between different headphones comply with LE Audio according to an aspect of the present disclosure.

First monitor 118 is configured to monitor the power of a battery of first wireless transceiver 110, i.e., the power of a battery of first wireless transceiver 110. First monitor 118 is further configured to send activation information to second wireless transceiver 120 and connect second wireless transceiver 120 to the audio source when the power of the battery of first wireless transceiver 110 is lower than the power threshold. Referring to FIG. 7, a wireless audio system 700 is provided, in which first left headphone 212A connects to first smartphone 210 to receive first audio source at first. First monitor 118 monitors the power of the battery of first left headphone 212A constantly and compares the monitored power with the power threshold. For example, when the power threshold is 10% of the power of first left headphone 212A being fully charged, first monitor 118 will send the activation information out when the monitored power is 8%. The activation information includes the communication information between first wireless transceiver 110 and the audio source through Classic Bluetooth, i.e., communication information between first left headphone 212A and first smartphone 210. Second wireless transceiver 120, i.e., first right headphone 212B can connect to the audio source, i.e., first smartphone 210, with the received activation information.

As a LE Audio broadcast provider, first wireless transceiver 110 consumes more power than second wireless transceiver 120, during the same period. When there is not enough power remaining in first wireless transceiver 110, neither communication between first wireless transceiver 110 nor the broadcasts between first wireless transceiver 110 and the other wireless transceivers is stable. First wireless transceiver 110 is not a suitable LE Audio broadcast provider in this situation. Thus, second wireless transceiver 120 is activated as the LE Audio broadcast provider.

Figure 6:
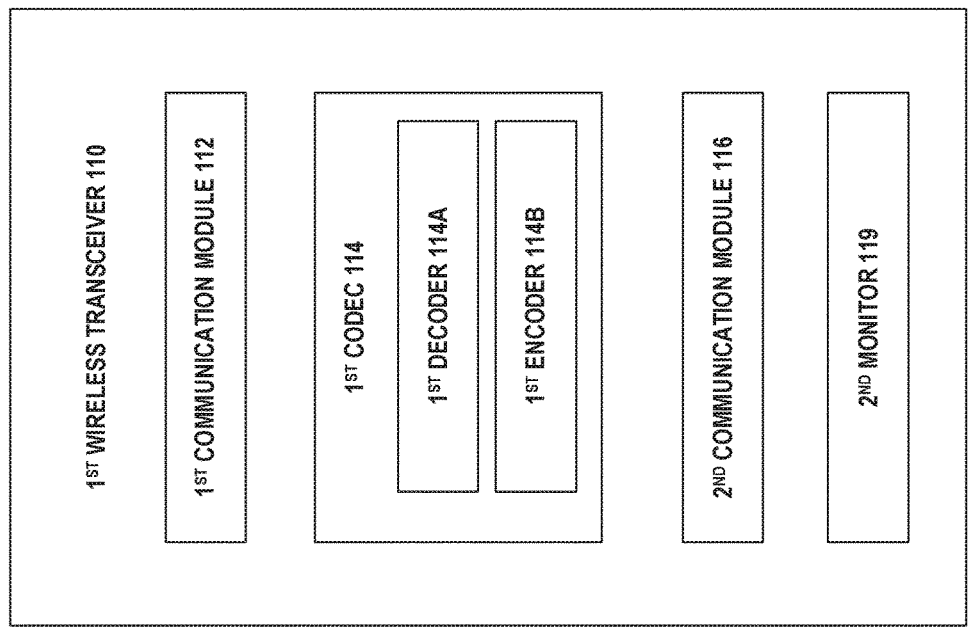
FIG. 6 is a block diagram illustrating an exemplary wireless audio system according to an aspect of the present disclosure.

FIG. 6 is a block diagram illustrating a wireless audio system 600 according to an aspect of the present disclosure. Compared with wireless audio system 500 showing in FIG. 5, first wireless transceiver 110 of wireless audio system 600 replaces the first monitor 118 with a second monitor 119, and second wireless transceiver 120 of wireless audio system 500 further includes a third monitor 128. Second monitor 119 is configured to measure the quality of the first audio information received by first wireless transceiver 110 and send activation information to second wireless transceiver 120 and connect second wireless transceiver 120 to the audio source when the quality of the first audio information received by first wireless transceiver 110 is lower than a first quality threshold. First wireless transceiver 110 employs Classic Bluetooth radio to obtain audio information. Once the quality of the connection between first wireless transceiver 110 and the audio source is poor, the quality of the first to third information will be unstable consequently, and first wireless transceiver 110 will no longer be suitable to continue as a broadcast provider.

Second monitor 119 is configured to monitor the quality of the first audio information received by first wireless transceiver 110. The quality of audio information can be characterized by any one or a combination of Received Signal Strength Indication (RSSI), Packet Error Rate (PER), Bit Error Rate (BER), Packet Loss Ratio (PLR), etc. Taking RSSI as an example, the larger an RSSI value is, the better quality of audio information is. While for PER, BER, and PLR, the closer the value is to zero, the better quality of audio information is. Second monitor 119 is further configured to send activation information to second wireless transceiver 120 and connect second wireless transceiver 120 to the audio source when the quality of the first audio information is lower than a first quality threshold. Referring to FIG. 7, first left headphone 212A connects to first smartphone 210 to receive first audio source at first. Second monitor 119 monitors the quality of the first audio information constantly and compares the monitored power with the first quality threshold. For example, second monitor 119 employs RSSI and uses a 1-100 scale, and the first quality threshold is 60. Second monitor 119 will send the activation information out when the monitored quality is below 60, like 45. The activation information includes the communication information between first wireless transceiver 110 and the audio source through Classic Bluetooth, i.e., communication information between first left headphone 212A and first smartphone 210. Second wireless transceiver 120 then connects to the audio source to get the first audio information after receiving the activation information. The first information received by second wireless transceiver 120 is then decoded and encoded to generate the fifth audio information to broadcast.

In some implementations of the present disclosure, referring to FIG. 6, second wireless transceiver 120 further includes a third monitor 128. Second wireless transceiver 120 takes the first audio information from the audio source because the quality of the first audio information received by first wireless transceiver 110 is poor. To replace first wireless transceiver 110 with second wireless transceiver 120, the quality of the first audio information received by first wireless transceiver 110 should be better than the first audio information received by second wireless transceiver 120. Third monitor 128 is configured to measure the quality of the first audio information received by second wireless transceiver 120, and then compare the obtained quality with a second quality threshold. When the quality of first audio information received by second wireless transceiver 120 is higher than the second quality threshold, third monitor 128 sends disconnection information to first wireless transceiver 110 to cutoff communication between the audio source and first wireless transceiver 110. When the quality of first audio information received by second wireless transceiver 120 is lower than the second quality threshold, third monitor 128 sends disconnection information to fourth communication module 122 to cut off communication between the audio source and second wireless transceiver 120. The second quality threshold can be equal to or higher than the first quality threshold. In the present implementation, both second monitor 119 and third monitor 128 employ RSSI and use a 1-100 scale, and the first quality threshold is 60 as mentioned above, then the second quality threshold can be 60 or higher than 60, for example, 65 or 70, etc.

In the present disclosure, it is important to replace first wireless transceiver 110 with second wireless transceiver 120 smoothly, i.e., during the switching between first and second wireless transceivers, the broadcast received by other audio players is continuous, interference-free, and stable. Therefore, first communication module 112 is configured to disconnect from the audio source after a first period. T1 when fourth communication module 122 is activated, and second communication module 116 is configured to stop broadcasting after a second period T2 when first communication module 112 disconnects from the audio source. In first period T1, fourth communication module 122 and first communication module 112 receive the same audio information from the audio source to eliminate desynchronization of audio transmission during the replacement of the broadcast provider. The desynchronization can be caused by the retransmission timing of payload units (PDUs) in a synchronous broadcast stream (BIS), encoding methods for LE Audio, the differences between Classic Bluetooth and LE Audio, and discontinuity between the PDUs in the Classic Bluetooth frame and the VDUs in the BIS of LE Audio, etc. In second period T2, third communication module 126 can broadcast the cached third audio information generated by recoding the first audio information received from the audio source. In some implementations, the first audio information received by first wireless transceiver 110 using Classic Bluetooth has a buffer with several milliseconds, even hundreds of milliseconds audio information, and second period T2 is configured to broadcast the buffered information. In some implementations, second communication module 116 is configured to stop broadcast the third information according to the disconnection information and send a switching information to third communication module 126. Accordingly, third communication module 126 is configured to start to broadcast the fifth audio information after receiving the switching information. In this way, second wireless transceiver 120 replaces first wireless transceiver 110 smoothly. For user who receives the broadcast, the received audio is stable and continuous.

Figure 8:
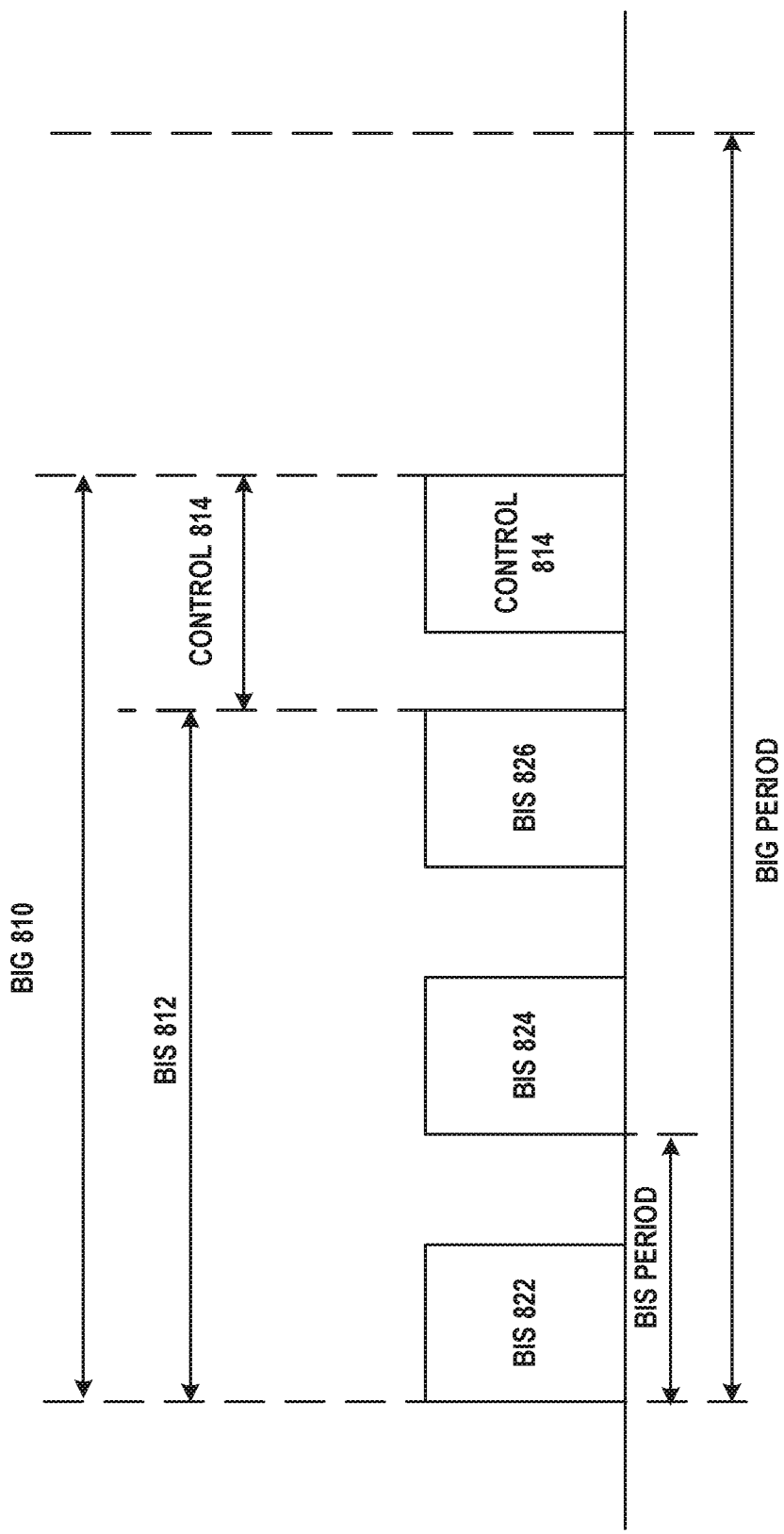
FIG. 8 is a schematical diagram illustrating information carried by a Broadcast Isochronous Group (BIG) according to an aspect of the present disclosure.

In first period T1, the first audio information is received by both first wireless transceiver 110 and second wireless transceiver 120 to satisfy the overlapping requirement caused by the retransmission timing of the PDUs for BIS. Referring to FIG. 8, information carried by a Broadcast Isochronous Group (BIG) according to an aspect of the present disclosure is provided. To support audio-sharing, LE Audio introduces BIG and BIS during communication. A BIG 810 includes several BISs 812 (only one BIS 812 is shown in FIG. 8) and a control stream 814, where intervals between adjacent BIGs is a BIG period. A BIS 812 includes several, for example, three, sub-BISs: a first sub-BIS 822, a second sub-BIS 824, and a third sub-BIS 826.

Figure 9:
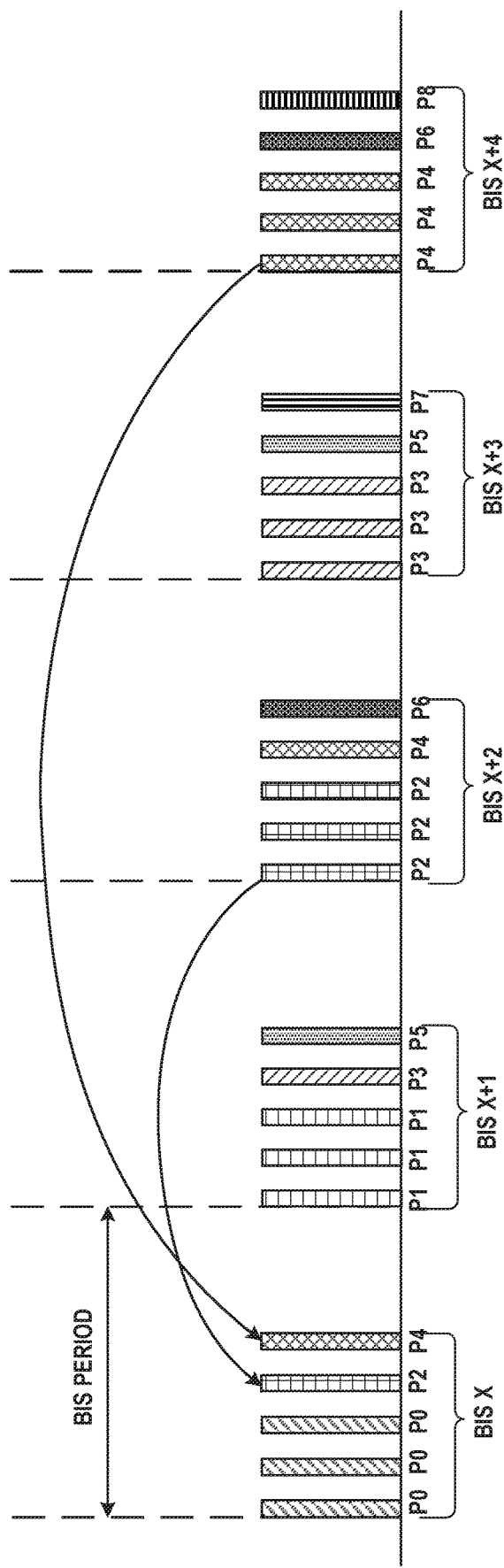
FIG. 9 is a schematical diagram illustrating the timing sequence of payload units (PDUs) in a BIG according to an aspect of the present disclosure.

FIG. 9 is a schematical diagram illustrating timing sequence of PDUs in a BIG according to an aspect of the present disclosure, in which the columns represent different PDUs. A plurality of PDUs is included in a BIS, and part of the plurality of PDUs are from a BIS after the current BIS. For example, in FIG. 9, a BIS X includes five PDUs, three of the five PDUs are p0 from the current stream BIS X, one of the five PDUs is p2 from a stream BIX X+2 shifting backwards by two from BIS X, and one of the five PDUs is p4 from a stream BIX X+4 shifting backwards by four from BIS X. A BIS X+1 includes five PDUs, three of the five VDUs are p1 from the current stream BIS X+1, one of the five PDUs is p3 from a stream BIX X+3 shifting backwards by two from BIS VT, and one of the five PDUs is p5 from a stream BIX X+5 shifting backwards by four from BIS X+1. Following this pattern, every PDU is carried five times in different BIS during communication to avoid data lost. As each BIS contains PDU coming from the afterward BIS, it is necessary for second wireless transceiver 120 to receive the same first audio information during first period T1 to satisfy the timing sequence of the first audio information. For example, BIS X and thereafter need to be switched from first wireless transceiver 110 to second wireless transceiver 120, it is necessary for first wireless transceiver 110 to receive p4 from BIS X+4, and for second wireless transceiver 120 to receive p1 from BIS X, which means that BIS X to BIS X+4 should be received by both first and second wireless transceivers to ensure the timing sequence during switching.

Figure 10:
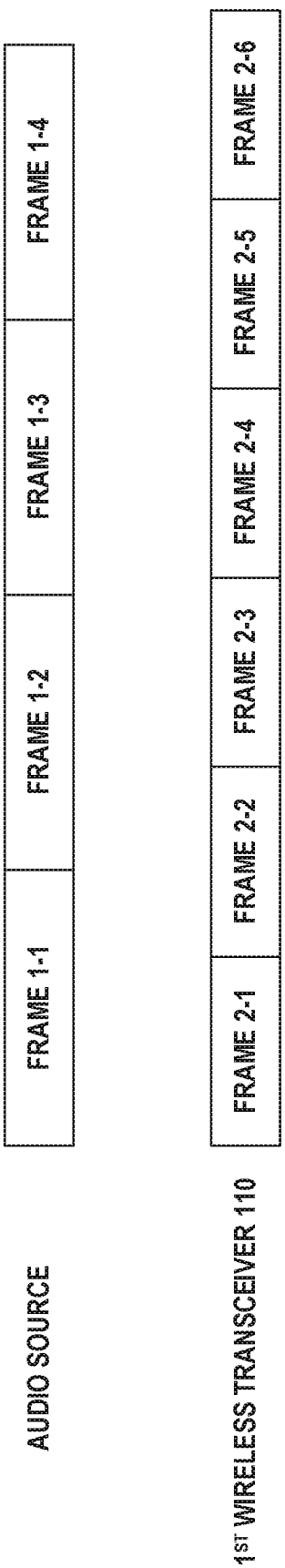
FIG. 10 is a block diagram illustrating exemplary frame divisions of audio information in Classic Bluetooth and LE Audio according to an aspect of the present disclosure.

In some implementations, overlap requirements are necessary due to the different divisions of audio frames between Classic Bluetooth and LE Audio, as shown in FIG. 10. The first audio information is sent to first communication module 112 and fourth communication module 122 through Classic Bluetooth, the coding methods include SBC, AAC, and the like. The third and fifth audio information are broadcasted through LE Audio, and the coding methods include LC and LC+. Different coding methods have different frame divisions. For example, for a first audio information and a third audio information corresponding to the same audio, the first audio information is divided into 4 frames by the audio source, and the third audio information is divided into 6 frames by first wireless transceiver 110. Some LE Audio fames may cross two Classic Bluetooth frames. For example, frame 2-2 cross frame 1-1 and frame 1-2, frame 2-5 cross frame 1-3 and frame 1-4. Thus, if the switching happens during frame 2-2, it is necessary for first wireless transceiver 110 and second wireless transceiver 120 to receive both frame 1-1 and frame 1-2.

Figure 11:
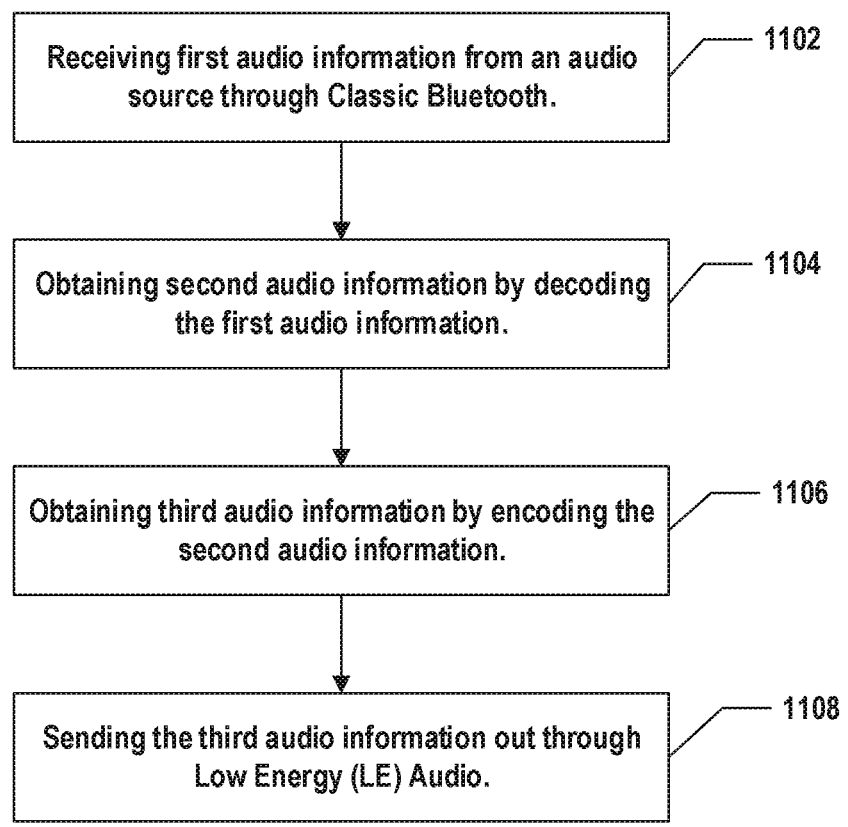
FIG. 11 is a flow chart illustrating an exemplary method for wirelessly communicating audio information according to an aspect of the present disclosure.

FIG. 11 is a flow chart illustrating another method 1100 for wirelessly communicating audio information in accordance with an embodiment. Method 1100 can be performed by processing logic that can include hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 11, as will be understood by a person of ordinary skill in the art.

Referring to FIG. 11, method 1100 is used for wirelessly communicating audio information. As shown in FIG. 1 and FIG. 3, wireless audio system 100 includes at least a first wireless transceiver 110 and a second wireless transceiver 120. First wireless transceiver 110 and second wireless transceiver 120 include, but not limited to, audio players, headphones, loudspeakers, screens, and the like. First wireless transceiver 110 includes a first communication module 112, a first codec 114, and a second communication module 116. Second wireless transceiver 120 includes a third communication module 126. In the present implementation, TWS headphones are taken as an example of the wireless transceivers, as shown in FIG. 3, a wireless audio system 300 in which audio shared between different headphones comply with LE Audio is provided. A first pair of headphones 212 comply with LE Audio include a first left headphone 212A and a first right headphone 212B. The first pair of headphones 213 are paired with a first smartphone 210 which does not support LE Audio.

Method 1100 proceeds to operation 1102, as illustrated in FIG. 11, in which the first audio information is received from the audio source through Classic Audio, i.e., the first audio information is sent from first smartphone 210 to first left headphone 212A through Classic Bluetooth, i.e., the first audio information is received by first communication module 112 in first left headphone 212A. The first Classic Bluetooth connection is built between first left headphone 212A and first smartphone 210 for audio transmission. The first audio information can be encoded and decoded during the audio transmission.

Method 1100 proceeds to operation 1104, as illustrated in FIG. 11, in which second audio information is obtained by decoding the first audio information by first decoder 114A. As described above, the first audio information is sent to first communication module 112 in various coding formats. First decoder 114A can decode the first audio information into PCM code, i.e., the second audio information. PCM code is the standard form of digital audio in computers, compact discs, digital telephony, and other digital audio applications. The second information is PCM code and can be encoded into other formats according to the needs of wireless transmission.

Method 1100 proceeds to operation 1106, as illustrated in FIG. 11, in which third audio information is obtained by encoding the second audio information by first encoder 114B. First encoder 114B can encode the PCM codes into codes comply with LE Audio, i.e., obtain third audio information by encoding the second audio information. For example, first encoder 114B and the third audio information are comply with LC3 or LC3+, or other codecs comply with LE Audio. Operations 1104 and 1106 can be performed in first codec 114, which is separated from a codec corresponding to the first Classic Bluetooth connection. In other implementations, operations 1104 and 1106 can also be performed in a codec integrated into the codec corresponding to first Classic Bluetooth connection.

Method 1100 proceeds to operation 1108, as illustrated in FIG. 11, in which the third information is sent to third communication module 126 through LE Audio by second communication module 116, i.e., the third audio information is broadcasted by first left headphone 212A to first right headphone 212B, second left headphone 222A, second right headphone 222B, and other audio players support LE Audio. In the present implementation, after the third audio information is broadcasted through LE Audio, any audio players support LE Audio can receive and play the broadcasted third audio information. In this way, audio-sharing is realized through LE Audio without a smartphone comply with LE Audio.

In some implementations, the third audio information is encrypted. Referring to FIG. 4, a wireless audio system 400 in which audio is shared between different headphones comply with LE Audio. First left headphone 212A of first pair of headphones 212 broadcasts the third audio information out, a second pair of headphones 222 receives the broadcasted information through LE Audio. As the third audio information is encrypted, headphones 222 cannot paly the corresponding audio. At this time, first smartphone 210 paired with first headphones sends the decryption information to a second smartphone 220 paired with headphones 222. Then the second smartphone 220 sends the decryption information to headphones 222 through a communication channel between headphones 222 and second smartphone 220 to decrypt the received third information, thus the audio can be played by headphones 222. The decryption information can be sent to second smartphone 220 through various wireless communication, for example, but not limited to, Classic Bluetooth radio, zig-Bee, Ultra-wideband (UWB), or Near-field communication (NFC). For example, first smartphone 210 generates a QR code including decryption information for second smartphone 220 to scan and get the decryption information.

In some implementations of the present disclosure, referring to FIG. 4, second communication module 116 is configured to send identification of the third audio information to second smartphone 220. The identification includes but not limits to the source of the audio, channel information, content information, etc. The identification can be displayed on an interactive interface of second smartphone 220 for user to see and react with second smartphone 220 and headphones 222. For example, the third audio information comprises a plurality of broadcast channels. The user can choose whether to receive the third audio information or not and choose which channel to receive. The user can also change the name of the received third audio information, store the received third audio information, and so on.

First communication module 112 is configured to receive, from an audio source, first audio information. The audio source can be a smart device that support Classic Bluetooth but not LE Audio, like smart devices on the market. A first Classic Bluetooth connection is built between first communication module 112 and the smart device for audio transmission. The first audio information can be encoded and decoded during the audio transmission. For example, the first audio information support sub-band coding (SBC), moving picture expert group (MPEG) coding, Advanced Audio Coding (AAC), adaptive transform acoustic coding (ATRAC), and other coding methods.

First codec 114 includes a first decoder 114A configured to obtain second audio information by decoding the first audio information, and a first encoder 114B configured to obtain third audio information by encoding the second audio information. As described above, the first audio information is sent to first communication module 112 in various coding formats, and first decoder 114A can decode the first audio information into pulse-code modulation (PCM) code, i.e., the second audio information. PCM code is the standard form of digital audio in computers, compact discs, digital telephony, and other digital audio applications. In a PCM stream, the amplitude of the analog signal is sampled regularly at uniform intervals, and each sample is quantized to the nearest value within a range of digital steps. First encoder 114B can encode the PCM codes into codes comply with LE Audio, i.e., obtain a third audio information by encoding the second audio information. For example, first encoder 114B and the third audio information are comply with third low complexity communication codec (LC3) or low complexity communication codec plus (LC3+), or other codecs comply with LE Audio. First codec 114 can be separated from a codec corresponding to the first Classic Bluetooth connection. In other implementations, first codec 114 can be integrated into the codec corresponding to first Classic Bluetooth connection 2. By integrating first codec 114 into the codec corresponding to first Classic Bluetooth connection, the cost and volume of first wireless transceiver 110 is reduced.

Second communication module 116 is configured to send the third audio information out. Second wireless transceiver 120 includes a third communication module 126 configured to receive the third audio information from first wireless transceiver 110. Both second communication module 116 and third communication module 126 employ LE Audio. The third audio information can be broadcasted to second wireless transceiver 120 and other audio players comply with LE Audio by second communication module 116. Second wireless transceiver 120 and other audio players can receive and play the third audio information through LE Audio regardless of the smartphone. That is, audio sharing can be achieved within audio players comply with LE Audio even the smartphones paired with the audio players are not comply with LE Audio. In this way, audio sharing can be easily employed among users because the limitations that the smartphone should be comply with LE Audio is removed.

Figure 12:
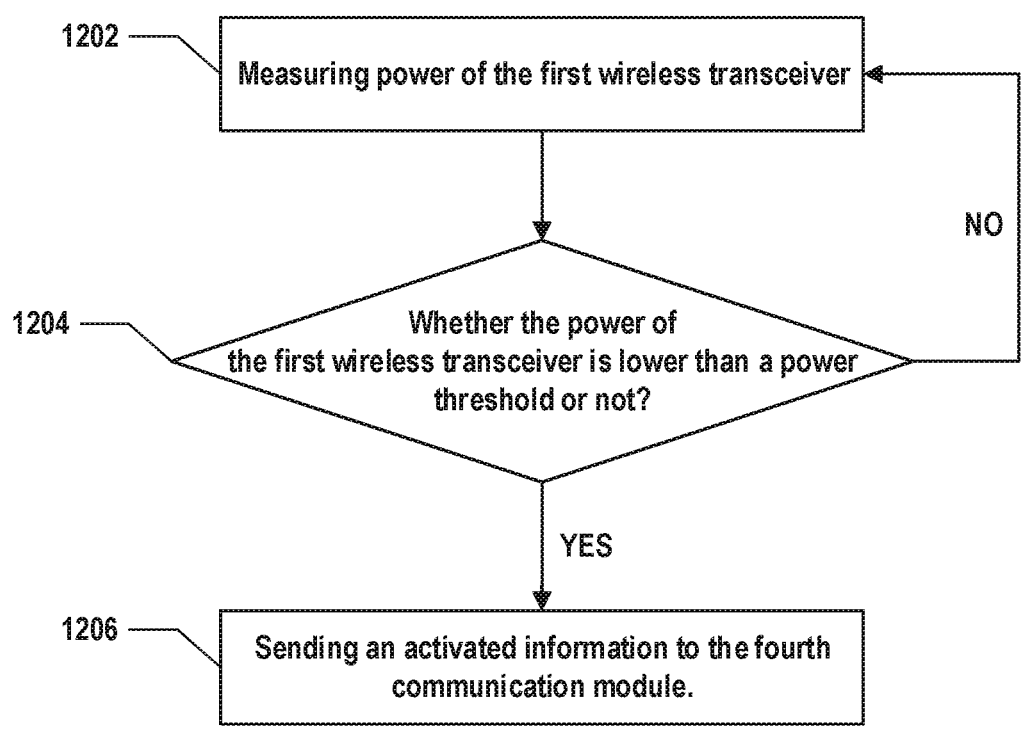
FIG. 12 is a flow chart illustrating an exemplary method for wirelessly communicating audio information according to an aspect of the present disclosure.

FIG. 12 is a flow chart illustrating another method 1200 for wirelessly communicating audio information in accordance with an embodiment. Method 1200 is an extension based on method 1100. Referring to FIG. 5, to perform method 1200, the first wireless transceiver 110 of wireless audio system 500 should further include a first monitor 118, second wireless transceiver 120 of wireless audio system 500 should further include a fourth communication module 122 and a second codec 124.

Method 1200 proceeds to operation 1202, as illustrated in FIG. 12, in which the power of the first wireless transceiver 110, i.e., the power of a battery of first left headphone 212A, is measured by first monitor 118. Method 1200 then proceeds to operation 1204, in which whether the power of first left headphone 212A is lower than the power threshold is determined. When the power of first left headphone 212A is lower than the power threshold, method 1200 then proceeds to operation 1206, in which the activation information is sent to fourth communication module 122.

First monitor 118 is further configured to send activation information to first right headphone 212B and connect first right headphone 212B to first smartphone 210 when the power of a battery of first left headphone 212A is lower than a power threshold. Referring to FIG. 7, first left headphone 212A connects to first smartphone 210 to receive first audio source at first. First monitor 118 monitors the power of the battery of first left headphone 212A constantly and compares the monitored power with the power threshold. For example, the power threshold is 10% of power of first left headphone 212A being fully charged, first monitor 118 will send the activation information out when the monitored power is 8%. The activation information includes the communication information between first wireless transceiver 110 and the audio source through Classic Bluetooth, i.e., communication information between first left headphone 212A and first smartphone 210. Second wireless transceiver 120, i.e., first right headphone 212B can connect to the audio source, i.e., first smartphone 210, with the received activation information. As a LE Audio broadcast provider, first wireless transceiver 110 consumes more power than second wireless transceiver 120, during the same period. When there is not enough power remaining in first wireless transceiver 110, neither communication between first wireless transceiver 110 nor the broadcasts between first wireless transceiver 110 and the other wireless transceivers is stable. First wireless transceiver 110 is not a suitable LE Audio broadcast provider in this situation. Thus, second wireless transceiver 120 is activated as the LE Audio broadcast provider.

Figure 13:
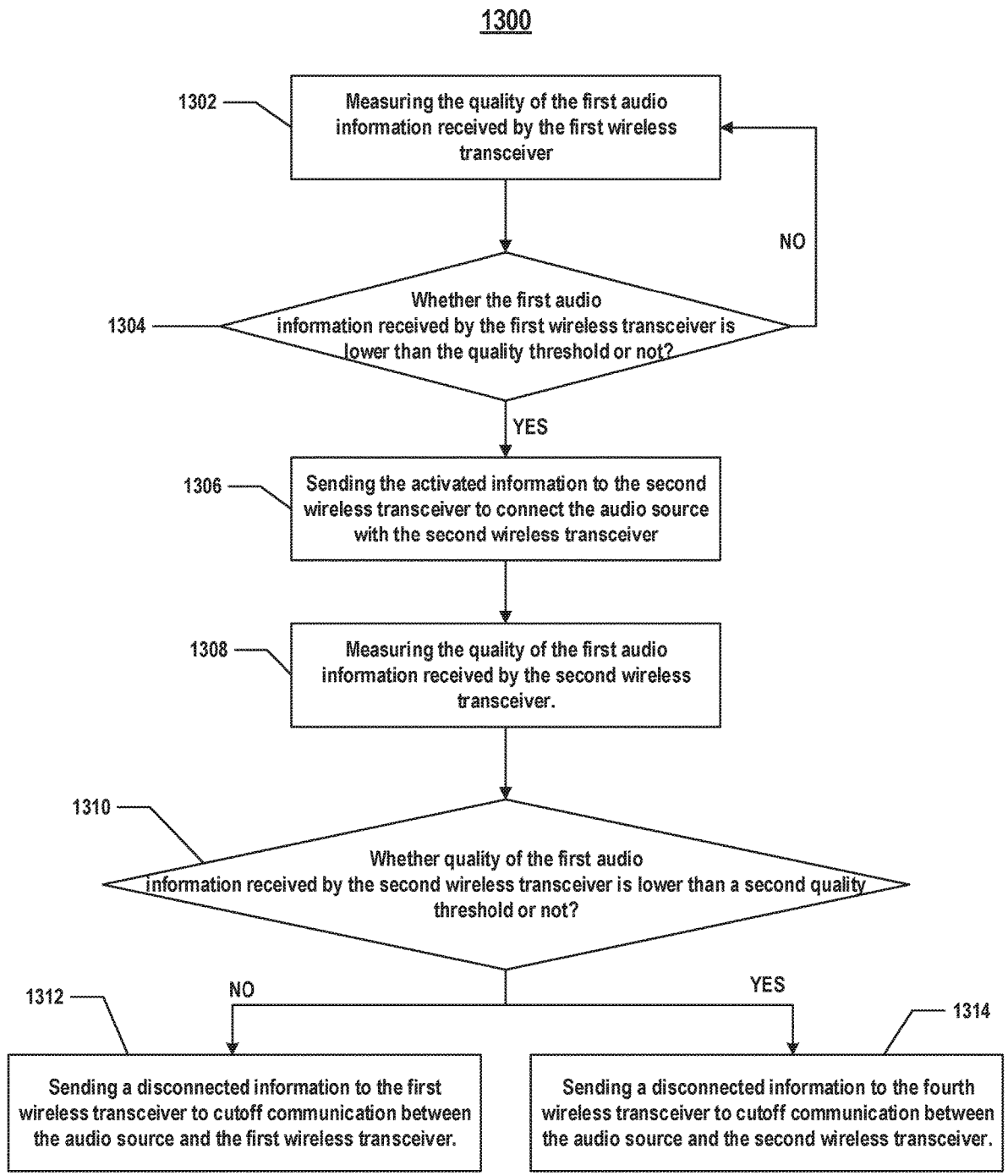
FIG. 13 is a flow chart illustrating an exemplary method for wirelessly communicating audio information according to an aspect of the present disclosure.

FIG. 13 is a flow chart illustrating another method 1300 for wirelessly communicating audio information in accordance with an embodiment. Method 1300 is an extension based on method 1100. Referring to FIG. 6, to perform method 1300, the first wireless transceiver 110 of wireless audio system 500 should further include a second monitor 119, second wireless transceiver 120 of wireless audio system 500 should further include a fourth communication module 122, a second codec 124, and a third monitor 128.

Method 1300 proceeds to operation 1302, as illustrated in FIG. 13, in which the quality of the first audio information received by first wireless transceiver 110 is measured by second monitor 119. First wireless transceiver 110 employs Classic Bluetooth radio to obtain audio information. Once the quality of the connection between first wireless transceiver 110 and the audio source is poor, the quality of the first to third information will be unstable. Consequently, first wireless transceiver 110 no longer be suitable to continue as a broadcast provider. Second monitor 119 is configured to measure the quality of the first audio information received by first wireless transceiver 110 and send activation information to second wireless transceiver 120 and connect second wireless transceiver 120 to the audio source when the quality of the first audio information received by first wireless transceiver 110 is lower than a first quality threshold.

Method 1300 proceeds to operation 1304, as illustrated in FIG. 13, in which whether the quality of the first audio information received by first wireless transceiver 110 is lower than the first quality threshold is measured by second monitor 119. If yes, then proceed to operation 1306, in which the activation information is sent to the second wireless transceiver 120 to connect the audio source with the second wireless transceiver 120.

Referring to FIG. 7, first left headphone 212A connects to first smartphone 210 to receive first audio source at first. Second monitor 119 monitoring the quality of the first audio information constantly and compared the monitored quality with the first quality threshold. For example, second monitor 119 employs RSSI and uses a 1-100 scale, the first quality threshold is 60. Second monitor 119 will send the activation information out when the monitored quality is below 60, like 45. The activation information includes the communication information between first wireless transceiver 110 and the audio source through Classic Bluetooth, i.e., at least one of Bluetooth address of the audio source, Bluetooth piconet clock of the audio source, Bluetooth frequency hopping information of the audio source, etc. Second wireless transceiver 120 then connects to the audio source to get the first audio information after receiving the activation information. The first audio information received by second wireless transceiver 120 is then decoded and encoded to generate the fifth audio information to broadcast.

Method 1300 proceeds to operation 1308, as illustrated in FIG. 13, in which the quality of the first audio information received by second wireless transceiver 120 is measured by third monitor 128. Then method 1300 proceeds to operation 1310, in which whether the quality of the first audio information received by second wireless transceiver 120 is lower than a second quality threshold or not is determined by the third monitor 128. If the quality of the first audio information received by second wireless transceiver 120 is higher than the second quality threshold, then proceed to operation 1312, in which disconnection information is sent to first wireless transceiver 110 to cut off communication between the audio source and first wireless transceiver 110. If the quality of the first audio information received by second wireless transceiver 120 is lower than the second quality threshold, then proceed to operation 1314, in which disconnection information is sent to fourth communication module 122 to cutoff communication between the audio source and second wireless transceiver 120.

Second wireless transceiver 120 takes the first audio information from the audio source because the quality of the first audio information received by first wireless transceiver 110 is poor. To replace first wireless transceiver 110 with second wireless transceiver 120, the quality of the first audio information received by second wireless transceiver 120 should be better than the first audio information received by first wireless transceiver 110. Third monitor 128 is configured to measure quality of the first audio information received by second wireless transceiver 120, and then compared the obtained quality with the second quality threshold. When the quality of first audio information received by second wireless transceiver 120 is higher than the second quality threshold, third monitor 128 sends disconnection information to first wireless transceiver 110 to cut off communication between the audio source and first wireless transceiver 110. When the quality of first audio information received by second wireless transceiver 120 is lower than the second quality threshold, third monitor 128 sends disconnection information to fourth communication module 122 to cut off communication between the audio source and second wireless transceiver 120. The second quality threshold can be equal to or higher than the first quality threshold. In the present implementation, both second monitor 119 and third monitor 128 employ RSSI and use a 1-100 scale. The first quality threshold is 60 as mentioned above, then the second quality threshold can be 60 or higher than 60, for example 65 or 70, etc.

In the present disclosure, it is important to replace first wireless transceiver 110 with second wireless transceiver 120 smoothly, i.e., during the switching between first and second wireless transceivers, the broadcast received by other audio players is continuous, interference-free and stable. Therefore, first communication module 112 is configured to disconnect from the audio source after a first period T1 when fourth communication module 122 is activated, and second communication module 116 is configured to stop broadcasting after a second period T2 when first communication module 112 disconnects from the audio source. In first period T1, fourth communication module 122, and first communication module 112 receive the same audio information from the audio source to eliminate desynchronization of audio transmission during the replacement of the broadcast provider. In second period T2, third communication module 126 can broadcast the buffered third audio information generated by recoding the first audio information received from the audio source. In some implementations, the first audio information received by first wireless transceiver 110 using Classic Bluetooth has a buffer with several milliseconds, even hundreds of milliseconds, and second period T2 is configured to broadcast the cached information. In some implementations, second communication module 116 is configured to stop broadcast the third information according to the disconnection information and send switching information to third communication module 126. Accordingly, third communication module 126 is configured to start to broadcast the fifth audio information after receiving the switching information. In this way, second wireless transceiver 120 replaces first wireless transceiver 110 smoothly. For user who receives the broadcast, the received audio is stable and continuous.

While the present disclosure has been described herein with reference to exemplary embodiments for exemplary fields and applications, it should be understood that the present disclosure is not limited thereto. Other embodiments and modifications thereto are possible and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments but should be defined only in accordance with the following claims and their equivalents.

What is claimed is:

1. A wireless audio system, comprising:
    a first wireless transceiver comprising:
        a first communication module configured to receive, from an audio source, first audio information;
        a first codec comprising:
            a first decoder configured to obtain, by decoding the first audio information, second audio information; and
            a first encoder configured to obtain, by encoding the second audio information, third audio information;
        a second communication module configured to send the third audio information out; and
    a second wireless transceiver comprising:
        a third communication module configured to receive, from the first wireless transceiver, the third audio information; wherein
    the second wireless transceiver is configured to receive, from an electronic device paired with the second wireless transceiver, decryption information for decrypting the third audio information; and
    the decryption information is generated and sent, by the audio source, to the electronic device paired with the second wireless transceiver.

2. The wireless audio system of claim 1, wherein the second audio information is a pulse code modulation (PCM) code, and the third audio information is compatible with Low Energy LE Audio.

3. The wireless audio system of claim 1, wherein the first encoder is compatible with low complexity communication codec (LC3) or low complexity communication codec plus (LC3+).

4. The wireless audio system of claim 1, wherein the third audio information is encrypted.

5. The wireless audio system of claim 1, wherein the third audio information comprises a plurality of broadcast channels.

6. The wireless audio system of claim 5, wherein the second wireless transceiver is configured to receive, from an electronic device paired with the second wireless transceiver, information of a selected broadcast channel.

7. The wireless audio system of claim 1, the second wireless transceiver comprising:
a fourth communication module configured to receive, from the audio source, the first audio information; and
a second codec configured to,
obtain, by decoding the first audio information, fourth audio information; and
obtain, by encoding the fourth audio information, fifth audio information, wherein, the fourth communication module employs Classic Bluetooth, and the third communication module is further configured to send the fifth audio information out.

8. The wireless audio system of claim 7, wherein the fourth communication module is activated by activation information sent by the first wireless transceiver when at least one of following conditions is met:
power of the first wireless transceiver is lower than a power threshold; or
quality of the first audio information received by the first wireless transceiver is lower than a first quality threshold.

9. The wireless audio system of claim 8, wherein the first wireless transceiver comprises
a first monitor configured to
measure the power of the first wireless transceiver, and
send to the second wireless transceiver and connect the second wireless transceiver to the audio source when the power of the first wireless transceiver is lower than the power threshold.

10. The wireless audio system of claim 8, wherein the first wireless transceiver comprises a second monitor configured to
measure the quality of the first audio information received by the first wireless transceiver, and
send the activation information to the second wireless transceiver and connect the second wireless transceiver to the audio source when the quality of the first audio information received by the first wireless transceiver is lower than the first quality threshold.

11. The wireless audio system of claim 10, wherein the second wireless transceiver comprises a third monitor configured to
measure quality of the first audio information received by the second wireless transceiver, and
send disconnection information to the first wireless transceiver to cut off communication between the audio source and the first wireless transceiver when the quality of the first audio information received by the second wireless transceiver is higher than a second quality threshold; or
send disconnection information to the fourth communication module to cut off communication between the audio source and the second wireless transceiver when the quality of the first audio information received by the second wireless transceiver is lower than the second quality threshold.

12. The wireless audio system of claim 8, wherein the first communication module is configured to disconnect from the audio source after a first period when the fourth communication module is activated.

13. A method for wirelessly communicating audio information, comprising:
receiving first audio information from an audio source through Classic Audio;
obtaining second audio information by decoding the first audio information;
obtaining third audio information by encoding the second audio information; and
sending the third audio information out through Low Energy (LE) Audio;
sending activation information out; and
disconnecting from the audio source after a first period when the activation information is sent out.

14. The method of claim 13, wherein the second audio information is a pulse-code modulation (PCM) code, and the third audio information is compatible with LE Audio.

15. The method of claim 13, wherein the third audio information is encrypted.

16. The method of claim 13, wherein the third audio information comprises a plurality of broadcast channels.

17. The method of claim 13, further comprising monitoring power of a first wireless transceiver or quality of the first audio information received by the first wireless transceiver, wherein the first wireless transceiver is configured to perform the method of claim 14.

18. The method of claim 17, wherein the activation information is sent out when at least one of following conditions is met:
the power of the first wireless transceiver is lower than a power threshold; or
quality of the first audio information received by the first wireless transceiver is lower than a first quality threshold.

* * * * *